United States Patent
Zimmermann

(10) Patent No.: US 11,302,979 B2
(45) Date of Patent: Apr. 12, 2022

(54) BATTERY ARRANGEMENT FOR THE STRUCTURAL INTEGRATION OF BATTERIES IN A VEHICLE

(71) Applicant: AIRBUS DEFENCE AND SPACE GMBH, Taufkirchen (DE)

(72) Inventor: Kristian Zimmermann, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 247 days.

(21) Appl. No.: 16/272,363

(22) Filed: Feb. 11, 2019

(65) Prior Publication Data
US 2019/0252655 A1 Aug. 15, 2019

(30) Foreign Application Priority Data

Feb. 12, 2018 (DE) ..................... 10 2018 202 120.1

(51) Int. Cl.
| | |
|---|---|
| *H01M 50/20* | (2021.01) |
| *H01M 10/6554* | (2014.01) |
| *H01M 10/613* | (2014.01) |
| *B64D 27/24* | (2006.01) |
| *B64G 1/42* | (2006.01) |
| *H01M 10/625* | (2014.01) |

(Continued)

(52) U.S. Cl.
CPC ............ *H01M 50/20* (2021.01); *B64D 27/24* (2013.01); *B64G 1/425* (2013.01); *H01M 10/613* (2015.04); *H01M 10/625* (2015.04); *H01M 10/6553* (2015.04); *H01M 10/6554* (2015.04); *H01M 10/6556* (2015.04); *H01M 50/213* (2021.01); *H01M 50/249* (2021.01); *H01M 50/502* (2021.01); *H01M 50/231* (2021.01); *H01M 2220/20* (2013.01)

(58) Field of Classification Search
CPC .................................................. H01M 50/213
See application file for complete search history.

(56) References Cited

U.S. PATENT DOCUMENTS

| | | |
|---|---|---|
| 8,383,260 B2 | 2/2013 | Essinger et al. |
| 8,833,499 B2 | 9/2014 | Rawlinson |

(Continued)

FOREIGN PATENT DOCUMENTS

| | | |
|---|---|---|
| CN | 205 583 100 U | 9/2016 |
| CN | 106 240 798 A | 12/2016 |

(Continued)

OTHER PUBLICATIONS

Extended European Search Report for Application No. 19155733.9 dated Apr. 9, 2019.

(Continued)

*Primary Examiner* — Jonathan Crepeau
(74) *Attorney, Agent, or Firm* — Jenkins, Wilson, Taylor & Hunt, P.A.

(57) ABSTRACT

A battery arrangement for the structural integration of batteries in a vehicle, in particular an aircraft or spacecraft, includes at least one battery; and two supporting, multi-layered structural laminates, between which the at least one battery is held on both sides via battery holders, wherein each multi-layered structural laminate has a cooling plate layer and a current collector layer, wherein the at least one battery is coupled electrically to the current collector layer.

12 Claims, 4 Drawing Sheets

(51) Int. Cl.
*H01M 10/6556* (2014.01)
*H01M 10/6553* (2014.01)
*H01M 50/502* (2021.01)
*H01M 50/213* (2021.01)
*H01M 50/249* (2021.01)
*H01M 50/231* (2021.01)

(56) References Cited

U.S. PATENT DOCUMENTS

| | | | |
|---|---|---|---|
| 8,967,529 | B1 | 3/2015 | Bennett |
| 9,559,394 | B2 | 1/2017 | Eckl et al. |
| 2006/0125442 | A1 | 6/2006 | Andersson et al. |
| 2009/0255109 | A1 | 10/2009 | Weber et al. |
| 2010/0047682 | A1 | 2/2010 | Houchin-Miller et al. |
| 2011/0183183 | A1 | 7/2011 | Grady et al. |
| 2011/0212355 | A1 | 9/2011 | Essinger et al. |
| 2012/0100407 | A1* | 4/2012 | Inoue ............... H01M 10/613 429/94 |
| 2013/0065103 | A1 | 3/2013 | Yumura |
| 2015/0266387 | A1 | 9/2015 | Garfinkel et al. |
| 2015/0349390 | A1 | 12/2015 | Aiba et al. |
| 2016/0056430 | A1 | 2/2016 | Burkman |
| 2016/0276637 | A1* | 9/2016 | Kusaba ............... H01M 2/1072 |
| 2017/0047624 | A1 | 2/2017 | Gunna et al. |
| 2018/0175466 | A1 | 6/2018 | Seo et al. |
| 2019/0252744 | A1 | 8/2019 | Zimmermann et al. |
| 2019/0296300 | A1 | 9/2019 | Zimmermann et al. |
| 2019/0334134 | A1 | 10/2019 | Reingruber et al. |
| 2020/0099030 | A1* | 3/2020 | Shimizu ............... H01M 50/213 |

FOREIGN PATENT DOCUMENTS

| | | |
|---|---|---|
| CN | 110165098 A | 8/2019 |
| CN | 110165100 A | 8/2019 |
| CN | 110294133 A | 10/2019 |
| DE | 10 2011 016 738 A1 | 10/2012 |
| DE | 10 2012 213 273 A1 | 2/2014 |
| DE | 10 2015 214 185 B4 | 3/2017 |
| DE | 10 2016 010 830 A1 | 3/2017 |
| DE | 10 2016 120 838 A1 | 5/2018 |
| EP | 3 220 444 A1 | 9/2017 |
| EP | 3 525 257 A1 | 8/2019 |
| EP | 3 525 259 A1 | 8/2019 |
| EP | 3 544 083 A1 | 9/2019 |
| EP | 3 525 257 B1 | 8/2020 |
| EP | 3 525 259 B1 | 12/2020 |
| JP | 2019194972 A | 11/2019 |
| KR | 20190098705 A | 8/2019 |
| WO | WO 2011/149868 A1 | 12/2011 |
| WO | WO 2017/004078 A1 | 1/2017 |

OTHER PUBLICATIONS

European Office Action for Application No. 19156600.9 dated Mar. 20, 2020.
European Search Report for Application No. 19162541.7 dated Jun. 27, 2019.
Extended European Search Report for Application No. 19156600.9 dated Jul. 11, 2019.
German Office Action for Application No. 10 2018 202 120.1 dated Dec. 14, 2018.
German Office Action for Application No. 10 2018 202 114.7 dated Dec. 20, 2018.
Non-Final Office Action for U.S. Appl. No. 16/360,757 dated Jun. 29, 2020.
Non-Final Office Action for U.S. Appl. No. 16/272,010 dated Aug. 21, 2020.
Final Office Action for U.S. Appl. No. 16/360,757 dated Jan. 4, 2021.
Advisory Action for U.S. Appl. No. 16/360,757 dated Mar. 16, 2021.
Final Office Action for U.S. Appl. No. 16/272,010 dated Apr. 13, 2021.
Non-Final Office Action for U.S. Appl. No. 16/360,757 dated May 24, 2021.
Advisory Action for U.S. Appl. No. 16/272,010 dated Jun. 1, 2021.
Notice of Allowance and Interview Summary for U.S. Appl. No. 16/272,010 dated Sep. 3, 2021.
Final Office Action for U.S. Appl. No. 16/360,757 dated Nov. 15, 2021.

* cited by examiner

BATTERY ARRANGEMENT FOR THE STRUCTURAL INTEGRATION OF BATTERIES IN A VEHICLE

CROSS-REFERENCE TO RELATED APPLICATION

This application claims priority to German Application No. 10 2018 202 120.1 filed Feb. 12, 2018, the entire disclosure of which is incorporated by reference herein.

TECHNICAL FIELD

The disclosure herein relates to a battery arrangement for the structural integration of batteries in a vehicle, in particular an aircraft or spacecraft.

Although usable in diverse applications, the disclosure herein and the problem on which the disclosure herein is based will be explained in more detail with respect to passenger aircraft. However, the described methods and devices can also be used in different vehicles and in all sectors of the transport industry, for example for road vehicles, for rail vehicles, for aircraft or for watercraft.

BACKGROUND

Lithium-ion batteries can be encountered as rechargeable energy accumulators in the most diverse sectors of the art. In particular, they serve in electromobility as energy accumulators for electric cars and hybrid vehicles. For this purpose, many manufacturers implement a multiplicity of batteries or battery cells in the form of what are referred to as battery packs in a vehicle structure, for example a motor vehicle body. In a battery pack or set of batteries of this type, it is entirely possible for several thousand individual cells to be connected to one another, e.g. lithium-ion round cells having a cylinder diameter of approximately 20 mm and a length of approximately 100 mm.

However, the generic integration concepts pursued in this case are not always suitable for meeting the technical requirements and boundary conditions for aircraft in a structural respect. Additional reinforcing measures such as, for example, supplementary stiffening structures would immediately increase the weight and therefore ultimately the fuel consumption.

In order to operate batteries of this type as efficiently as possible, it is indispensable in typical use to provide active temperature control of the batteries. This is not least relevant in the air and space travel sector because of the greatly fluctuating operating or ambient temperatures. For suitable temperature control of the batteries of a battery pack, use can be made, for example, of devices, such as cooling plates or similar, in which a liquid and/or a gas is flushed through fluid ducts; see, for example, the documents U.S. Pat. No. 8,383,260 B2 and US 2017/0047624 A1. Cooling devices of this type additionally increase the weight.

Against this background, the disclosure herein is based on the object of finding solutions for efficient and light-weight integration of a large number of battery cells in a vehicle.

SUMMARY

According to the disclosure herein, this object is achieved by a battery arrangement and by an aircraft or spacecraft with features described herein.

According thereto, a battery arrangement for the structural integration of batteries in a vehicle is provided. The battery arrangement comprises at least one battery; and two supporting, multi-layered structural laminates, between which the at least one battery is held on both sides via battery holders, wherein each multi-layered structural laminate has a cooling plate layer and a current collector layer, wherein the at least one battery is coupled electrically to the current collector layer.

Furthermore, an aircraft and spacecraft with a battery arrangement according to the disclosure herein is provided.

A concept on which the disclosure herein is based involves integrating cooling plates together with current collectors and further parts in the form of a layered laminate structure in a single component so that all of these parts together carry out both thermal and mechanical functions. In this manner, additional structure-reinforcing components can be saved, which in turn optimizes the number of components and ultimately the weight. To put it another way, the weight-dependent energy and power density of a battery arrangement or of a vehicle can be improved with these measures. Furthermore, the battery arrangement can to a certain extent replace existing structures since loads can be conducted through the battery arrangement. Compressive and shearing forces can be conducted here directly through the at least one battery or battery cell, i.e. the at least one battery can take on at least a portion of the loads. Diverse functions can be realized with a single component, i.e. a multi-functional battery arrangement is provided. The current collector layer here can comprise an electrically conductive material, and therefore the current collector layer can replace a customarily used busbar, for example a copper rail. The multi-layered structural laminate therefore combines properties of a busbar, a cooling plate and a structural component in one single element.

A laminate or a laminate structure within the context of the disclosure herein refers to a material or a component which is composed of or comprises two or more layers connected in a planar manner to one another in an integrally bonded manner. The layers can be composed of identical or different materials and can carry out different functions. The individual layers can be, for example, adhesively bonded, pressed, welded and/or baked or the like to one another. For example, the individual layers can be connected to one another via a connecting substance or via a matrix material, for example with an adhesive and/or a synthetic resin. Individual layers or a plurality of layers can also be embedded in a material of this type.

A battery within the context of the disclosure herein is a general, rechargeable electric accumulator element. It may be a secondary cell, i.e. an individual accumulator element in the sense of a secondary element, an accumulator cell, a rechargeable cell, a battery cell or the like. However, batteries according to the disclosure herein in principle also comprise interconnected secondary cells and/or interconnected accumulator elements, i.e. a battery consisting of secondary cells. Batteries within the context of the disclosure herein in particular comprise lithium-ion batteries.

Advantageous refinements and developments emerge from the description with reference to the figures.

According to one development, the multi-layered structural laminates can furthermore each comprise a signal conducting layer to which the at least one battery is electrically coupled. The signal conducting layer can serve, for example, to control and/or regulate the at least one battery or battery cell. Alternatively or additionally, currents, voltages and/or temperatures of the at least one battery or battery arrangement can be measured. The data on the basis therefrom can be transmitted via the signal conducting layers to a battery management system (BMS). Conclusions with regard to the charging state, etc. can be drawn on the basis of the data. For example, the at least one battery can be communicatively coupled to a central computing unit via the signal conducting layer(s), wherein the computing unit can be designed to monitor, evaluate and optionally to regulate a state or status of the at least one battery.

According to one development, the multi-layered structural laminates can furthermore each comprise at least one electrical insulating layer. For example, an insulating layer can be arranged between a metallic current collector layer and a metallic cooling plate layer in order to avoid short circuits between the two layers. Alternatively or additionally, an insulating layer can electrically insulate, for example, one or more signal conducting layers, current collector layers and/or cooling plate layers, from one another.

According to one development, the cooling plate layer can in each case form a core of the multi-layered structural laminate. The cooling plate layer can therefore constitute a structural core of the laminate making the laminate resistant to different loads. For example, the cooling plate layer can be formed from a metal material having high resistance and strength.

According to one development, at least one of the multi-layered structural laminates can comprise a plurality of current collector layers, signal conducting layers and/or electrical insulating layers which are arranged on both sides around the cooling plate layer. Furthermore, a battery holder can be connected on both sides in each case to the structural laminate, for example can be adhesively bonded thereto or baked therewith. In such a manner, it is possible to combine together a greater or lesser number of structural laminates next to one another with batteries located in each case in between, in order thus to integrate a large number of batteries in a laminate structure. In each case two structural laminates with the batteries fastened therebetween can be considered here to a certain extent as a battery module or battery segment which can be followed on both sides in each case by further battery modules in order to construct larger structures from a multiplicity of individual modules.

According to one development, the at least one battery can be coupled at least on one side via an electrically conductive spring to the current collector layer. In this development, welding of the at least one battery to the current collector layer is unnecessary (as customarily takes place for the connection of batteries to busbars). Batteries can therefore be mounted in a simple manner, for example by simple plugging and/or pushing of individual batteries into the battery holder. In general, the accessibility of the battery arrangement during the installation is significantly improved. Secondly, a spring of this type automatically compensates for tolerances.

According to one development, the battery holders can be designed with a battery receptacle for receiving the at least one battery on one side. For example, the at least one battery can be mounted on both sides in a form-fitting manner in the battery holders. For the installation, the at least one battery can be introduced at first on one side in a battery holder of a structural laminate and fastened, with it being possible for the at least one battery to be held in a precisely fitting manner in the corresponding battery receptacle. In a second step, a battery holder of a further structural laminate can be fitted and plugged together with the structure in such a manner that the at least one battery is introduced by the other side into the further battery holder. For example, the battery holders can be manufactured from a plastic and can be connected in an integrally bonded manner to the multi-layered structural laminate and/or can be fastened thereto. The battery receptacles can furthermore be formed with a through hole or a through opening towards the corresponding current collector layer.

According to one development, the at least one battery can be fastened to the battery holder via an integrally bonded connection. The at least one battery can be fastened to the battery holder, for example, via a thermally conductive adhesive. In principle, however, mechanical holders and/or plug-in, clip-type and/or snap-action mechanisms or the like are also possible for the fastening of the at least one battery.

According to one development, the cooling plate layer can be manufactured integrally with a multiplicity of fluid ducts from a metal material. For example, the cooling plate layer can be manufactured from a metal, a metal alloy, a metallic material and/or a combination of the materials. In one specific example, the cooling plate layer is manufactured from titanium. For example, use can be made of an additive method for manufacturing the cooling plate layer, in which the cooling plate layer is completely manufactured in an integral manner without a particular outlay, additional installation steps or even manual work being necessary. In principle, the cooling plate layers can be manufactured from all materials or material combinations for which additive methods are known.

In generative or additive manufacturing methods, also generally referred to as "3D printing methods", proceeding from a digitized geometric model of an object, one or more starting materials are layered sequentially one above another and hardened. Thus, in selective laser melting (SLM), for example, a component is built up in layers from a modelling material, for example a plastic or a metal, by the modelling material being applied in powder form to a support and being liquefied in a targeted manner by local laser irradiation, with the result that, after cooling, a solid, coherent component is obtained. 3D printing offers extraordinary design freedom and makes it possible to produce, inter alia, objects with negligible outlay which would not be able to be produced, or would be able to be produced only with considerable outlay, with conventional methods. For this reason, 3D printing methods are currently widespread in industrial design, in the automotive industry, in the air and space travel industry or generally in industrial product development in which a resource-efficient process chain is used for the need-based small and large series manufacturing of individualized components.

3D printing methods are particularly advantageous in the present case since they allow the production of three-dimensional parts in primary forming methods without requiring specific manufacturing tools tailored to the outer shape of the parts. This makes possible highly efficient, material-saving and time-saving production processes for components and parts. Such 3D printing methods are particularly advantageous in the air and space travel sector, since very many different components tailored to specific use purposes are used there, and these components can be produced in such 3D printing methods with low costs, short manufacturing lead time and with little complexity in the manufacturing plants required for the production. 3D printing methods within the context of the present application comprise all generative or additive manufacturing methods in which, on the basis of geometric models, objects of predefined shape are produced from shapeless materials such as liquids and powders or shape-neutral semifinished products, such as, for example, strip- or wire-like material by chemical and/or physical processes in a specific generative manufacturing system. 3D printing methods within the context of the present application use additive processes in which the starting material is built up sequentially in layers in predetermined shapes.

According to one development, at least two cover plates can furthermore be provided, which close off the multi-layered structural laminates with the at least one battery lying in between. The cover plates can be manufactured, for example, from a plastic, a ceramic material, a metal material or a combination of the materials. In principle, the cover plates in cooperation with the multi-layered structural laminates can therefore to a certain extent form a housing of the battery arrangement, wherein at least the multi-layered structural laminates, however, also take on structural tasks.

According to one development, at least one of the cover plates can be designed as a heat exchanger with a multiplicity of cooling fins. In this embodiment, in particular formation of the corresponding cover plate or cover plates from a metallic material is appropriate. The cooling fins are particularly advantageous in order to dissipate towards the outside heat generated by the batteries.

According to one development, the cover plates can close off a multiplicity of multi-layered structural laminates with batteries lying in between. In general, a set of two multi-layered structural laminates with the batteries held in between can in each case be understood as a battery module. For example, a multiplicity of such battery modules can be combined with one another in order to form a battery set with a large number of individual cells. The multiplicity of battery modules can be closed off here by the cover plates.

According to one development, the battery arrangement can form part of a structural component of the aircraft or spacecraft.

The above refinements and developments can be combined with one another as desired, if expedient. Further possible refinements, developments and implementations of the disclosure herein also comprise combinations, which are not explicitly mentioned, of features of the disclosure herein described previously or below with respect to the exemplary embodiments. In particular, a person skilled in the art will also add individual aspects as improvements or additions to the respective basic form of the disclosure herein.

BRIEF DESCRIPTION OF THE DRAWINGS

The disclosure herein will be explained in more detail below with reference to the example embodiments indicated in the schematic figures, in which.

Figure 1:
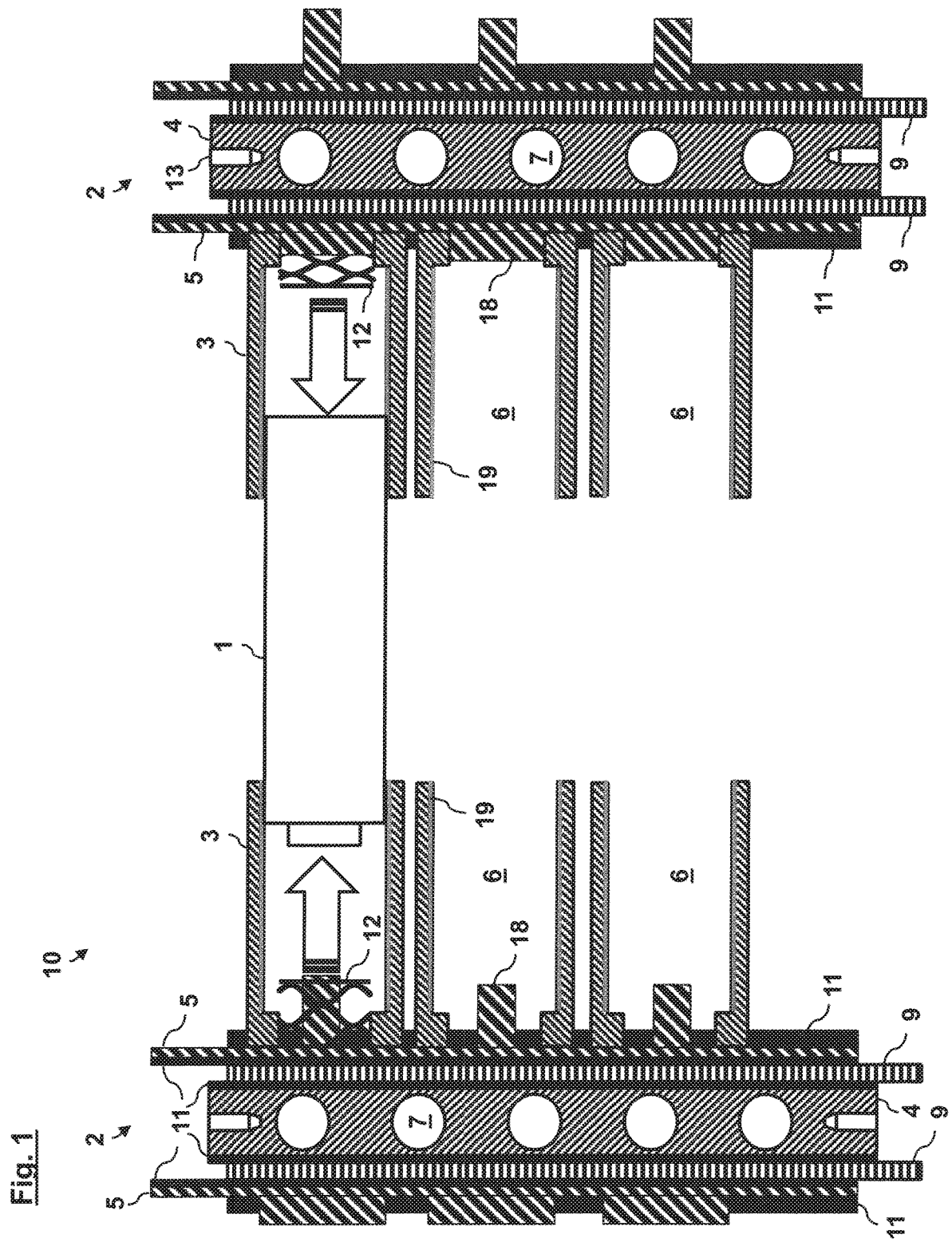
FIG. 1 shows a schematic sectional view of the individual parts of a battery arrangement according to one embodiment of the disclosure herein.

The attached figures are intended to provide further understanding of the embodiments of the disclosure herein. They illustrate embodiments and serve in conjunction with the description for explaining principles and concepts of the disclosure herein. Other embodiments and many of the advantages mentioned emerge with respect to the drawings. The elements of the drawings are not necessarily shown true to scale with respect to one another.

DETAILED DESCRIPTION

In the figures of the drawing, identical, functionally identical and identically acting elements, features and parts are each provided with the same reference signs unless stated otherwise.

Figure 2:
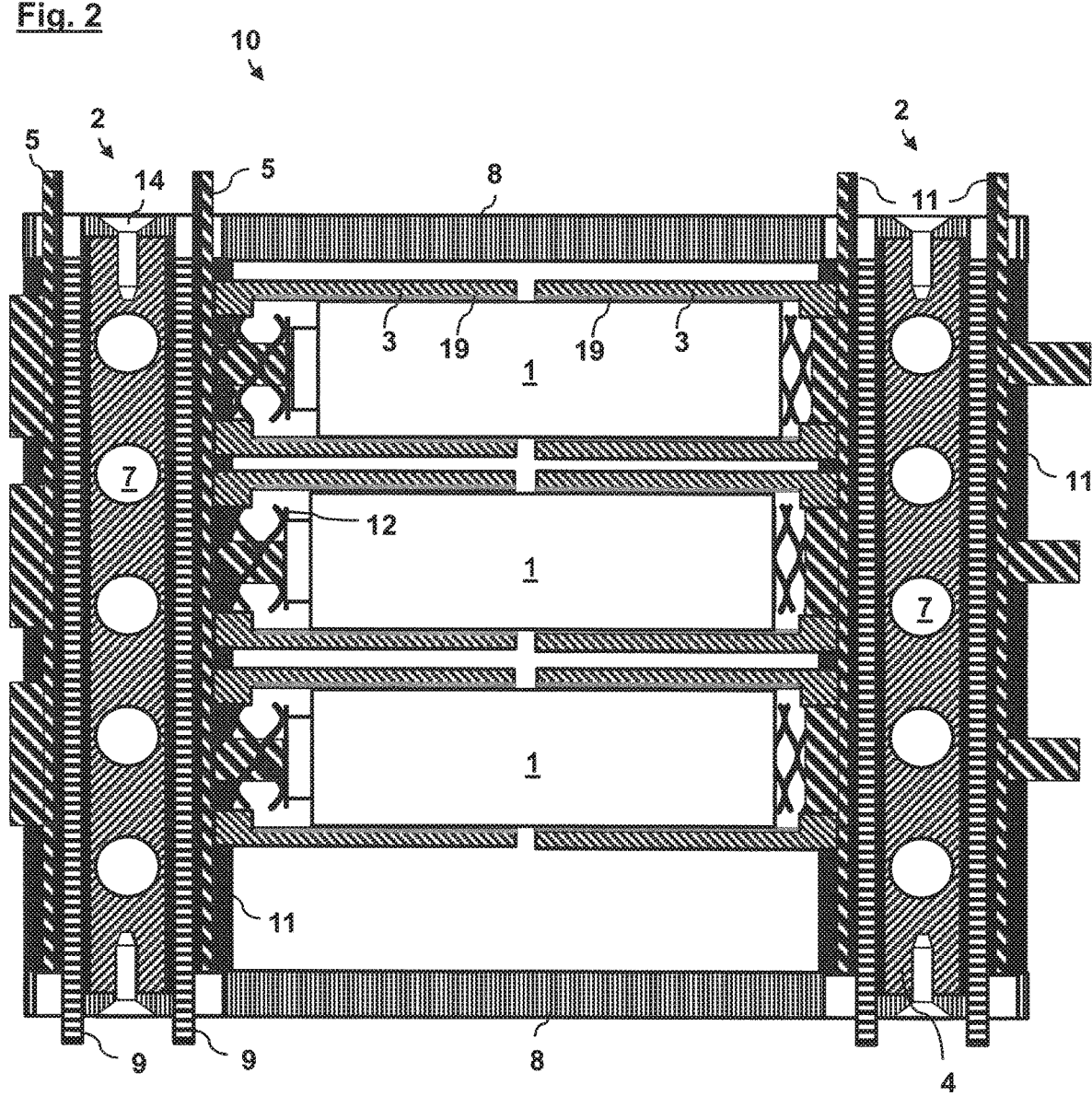
FIG. 2 shows a schematic sectional view of the battery arrangement from FIG. 1 in a mounted state.

FIG. 1 shows a schematic sectional view of the individual parts of a battery arrangement 10 according to one embodiment of the disclosure herein, while FIG. 2 depicts the battery arrangement from FIG. 1 in a mounted state.

Figure 5:
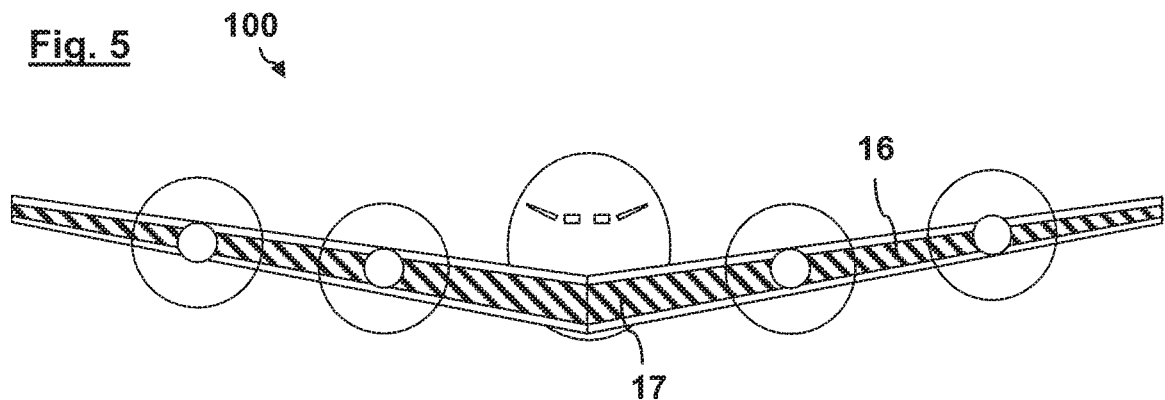
FIG. 5 shows a schematic front view of an aircraft with the wing structure from FIG. 4.
Figure 6:
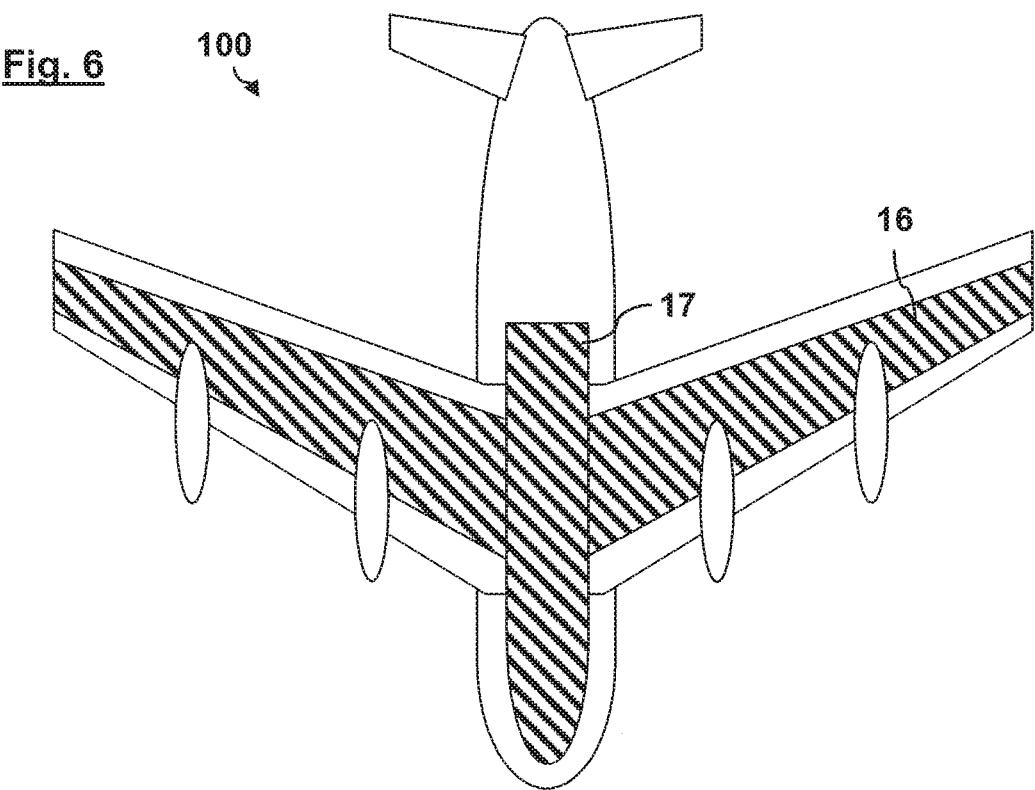
FIG. 6 shows a schematic side view of the aircraft from FIG. 5.

The battery arrangement 10 serves for structurally integrating batteries 1 in a vehicle, in particular an aircraft 100 (e.g. a passenger aircraft), as can be seen schematically in FIGS. 5 and 6. The battery arrangement 10 comprises a multiplicity of batteries 1 (for example individual lithium-ion battery cells) which are held between two supporting, multi-layered structural laminates 2 on both sides via battery holders 3. The multi-layered structural laminate 2 comprises a core comprising or consisting of a cooling plate layer 4 which is surrounded by current collector layers 5 and signal conducting layers 9 which are each separated from one another and from the cooling plate layer 4 via electrical insulating layers 11. The cooling plate layers 4 have a multiplicity of fluid ducts 7 which are designed for the passage of a fluid, i.e. a gas and/or a liquid. The batteries 1 are coupled electrically here on both sides in each case to a current collector layer 5 and to a signal conducting layer 9. The batteries 1 are in contact here via an electrically conductive spring 12 which is in each case arranged on both sides of each battery 1 within a battery receptacle 6 of the battery holder 3. In addition, the batteries 1 themselves are fastened to the battery holder 3 via an adhesive 19. The batteries 1 can be, for example, a known type of lithium-ion secondary battery which is in the form of a round cell and is frequently used, for example, in the electric car sector.

Furthermore, the battery arrangement 10 comprises two cover plates 8 (which cannot be seen in FIG. 1) which close off the multi-layered structural laminates 2 with the batteries 1 lying in between. The cover plates 8 are fixedly connected here to the multi-layered structural laminate 2 via connecting elements 14, such as screws, rivets, bolts or the like. In principle, the cover plates 8 can close off a multiplicity of multi-layered structural laminates 2 with batteries 1 lying in between. Within this context, the battery arrangement 10 in FIG. 2 can be understood as being a battery module, of which as many as desired can be arranged next to one another, above one another and/or behind one another.

Figure 3:
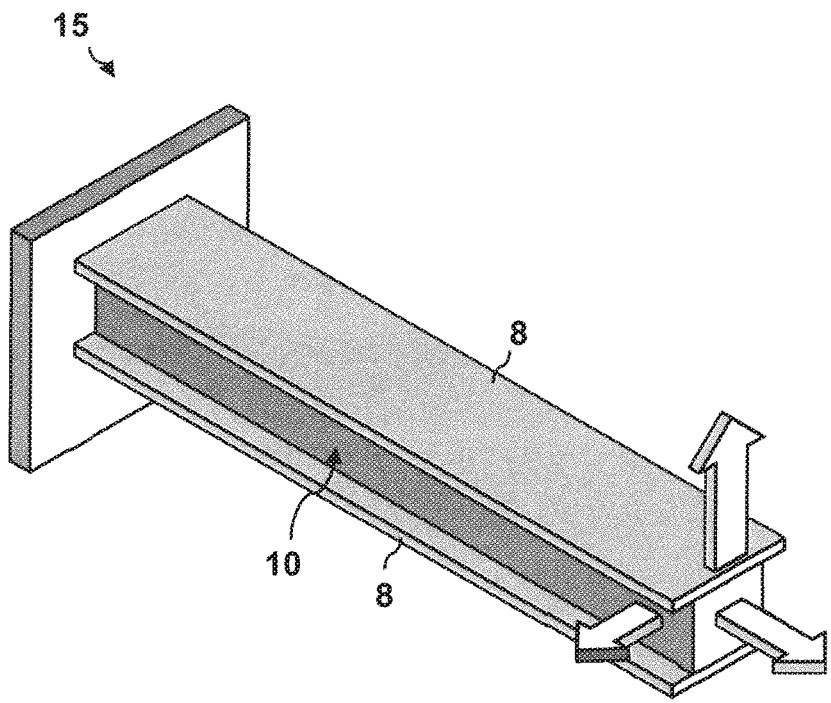
FIG. 3 shows a schematic perspective view of a structural component with the battery arrangement from FIG. 2.
Figure 4:
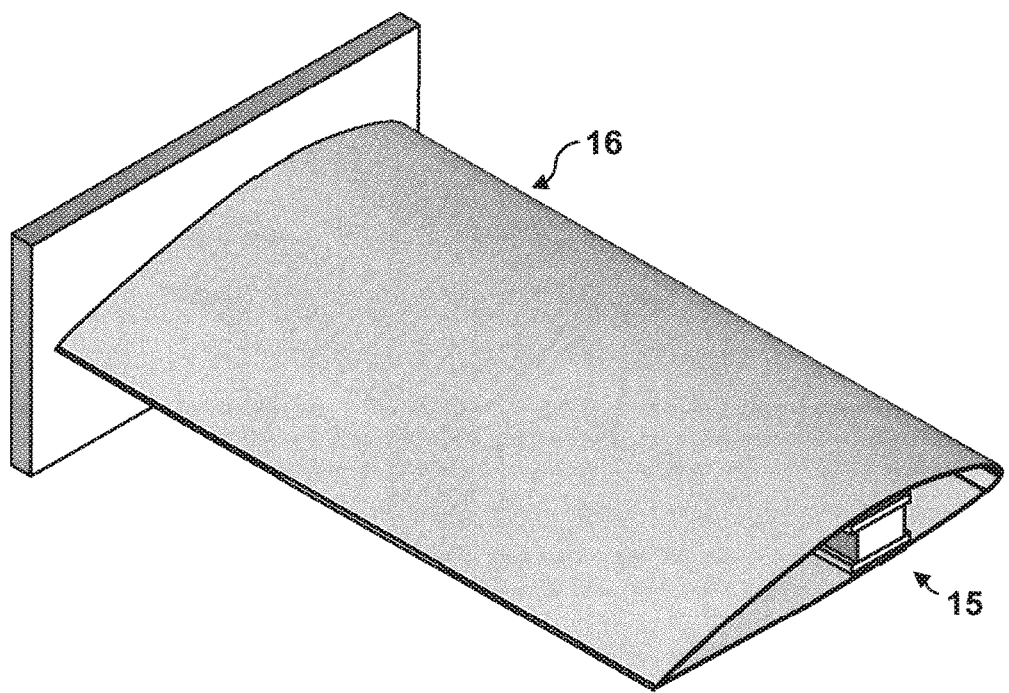
FIG. 4 shows a schematic perspective view of a wing structure with the structural component from FIG. 3.

FIG. 3 shows a schematic perspective view of a structural component 15 with one or more of the battery arrangements 10 from FIG. 2. For example, such a structural component 15 can form part of a wing structure 16, as is illustrated in FIG. 4. Alternatively or additionally, it can likewise form part of a fuselage structure 17 (cf. FIGS. 5 and 6). In FIG. 3, loads which are in action are identified by arrows, and it is intended as a result to clarify that the battery arrangement 10 itself takes on a supporting structural function. The multi-layered structural laminates 2 serve here not only for holding and fixing the batteries 1 in the aircraft 100. The multi-layered structural laminates 2 furthermore contribute to the structure of the aircraft 100 as such, with the batteries 1 also being part of the primary structure. The load path extends here from the individual batteries 1 or battery cells via the battery holders 3 to the multi-layered structural laminates 2 and from there via the cover plates 8 into the wing structure 16 or fuselage structure 17 of the aircraft 100. Within this context, the battery arrangement 10 can in particular to a certain extent replace and/or supplement existing structures since loads can be conducted through the battery arrangement 10. It is thereby possible to save on further structure-reinforcing components and therefore to save on weight and ultimately fuel and costs. In this embodiment, the cooling plate layers 4 themselves as a structural core of the multi-layered structural laminates 2 are advantageously manufactured integrally with an additive method from titanium or a titanium alloy, i.e. a highly resistant material having a high strength and relatively low density. 3D printing methods make it possible here to manufacture the cooling plate layers 4 including the fluid ducts 7 completely in one process step, which would at best be possible with a considerable outlay by conventional methods. The cooling plate layers 4 can furthermore be connected to a separate, external heat exchanger (not shown) in order to remove the generated heat or power loss.

A battery arrangement 10 is thereby therefore integrated structurally in an aircraft 100, wherein multi-layered structural laminates 2 not only carry out structural functions, but furthermore can be used for diverse purposes including the electrical coupling together and control or regulation of the batteries and control of the temperature of the batteries. Furthermore, the multi-layered structural laminate 2, for example in cooperation with the cover plates 8, can serve as a fire protection layer or protective encapsulation of the battery arrangement 10.

In the preceding detailed description, various features for improving the stringency of the illustration have been combined in one or more examples. However, it should be clear here that the above description is merely illustrative, and is not of a restrictive nature in any way. It serves to cover all the alternatives, modifications and equivalents of the various features and exemplary embodiments. Many other examples will become clear immediately and directly to a person skilled in the art on the basis of his/her specialist knowledge in view of the above description.

The exemplary embodiments have been selected and described in order to be able to present the principles underlying the disclosure herein and their application possibilities in practice as well as possible. As a result, specialist personnel can modify and use the disclosure herein and its various exemplary embodiments in an optimum way with respect to the intended purpose of use. In the claims and the description, the terms "including" and "having" are used as neutral terms for the corresponding term "comprising". Furthermore, use of the terms "a", "an" and "one" is not intended to exclude in principle a multiplicity of features and parts which are described in such a way.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Battery
2 Structural laminate
3 Battery holder
4 Cooling plate layer
5 Current collector layer
6 Battery receptacle
7 Fluid duct
8 Cover plate
9 Signal conducting layer
10 Battery arrangement
11 Electrical insulating layer
12 Electrically conductive spring
13 (Through) bore
14 Connecting element
15 Structural component
16 Wing structure
17 Fuselage structure
18 Battery contact
19 Adhesive
100 Aircraft

The invention claimed is:

1. A battery arrangement for structural integration of batteries in a vehicle comprising:
   at least one battery; and
   two supporting, multi-layered structural laminates comprising battery holders, between which the at least one battery is held on both sides;
   wherein each multi-layered structural laminate has a cooling plate layer and a current collector layer, the at least one battery being coupled electrically to the current collector layer;
   wherein at least one of the multi-layered structural laminates comprises a plurality of electrical insulating layers, which are arranged on both sides around the cooling plate layer; and
   wherein a multiplicity of fluid ducts from a metal material is integrated within each cooling plate layer.

2. The battery arrangement according to claim 1, wherein the multi-layered structural laminates each comprise a signal conducting layer to which the at least one battery is electrically coupled.

3. The battery arrangement according to claim 1, wherein the multi-layered structural laminates each comprise at least one electrical insulating layer.

4. The battery arrangement according to claim 1, wherein the cooling plate layer in each case forms a core of the multi-layered structural laminate.

5. The battery arrangement according to claim 1, wherein at least one of the multi-layered structural laminates comprises a plurality of current collector layers and/or signal conducting layers, which are arranged on both sides around the cooling plate layer.

6. The battery arrangement according to claim 1, wherein the at least one battery is coupled at least on one side via an electrically conductive spring to the current collector layer.

7. The battery arrangement according to claim 1, wherein the battery holders are designed with a battery receptacle for receiving the at least one battery on one side.

8. The battery arrangement according to claim 1, wherein the at least one battery is fastened to the battery holder via an integrally bonded connection.

9. The battery arrangement according to claim 1, comprising at least two cover plates which close off the multi-layered structural laminates with the at least one battery lying in between.

10. The battery arrangement according to claim 9, wherein the cover plates close off a multiplicity of multi-layered structural laminates with batteries lying in between.

11. An aircraft or spacecraft with a battery arrangement for structural integration of batteries in an aircraft or spacecraft, the battery arrangement comprising:
   at least one battery; and
   two supporting, multi-layered structural laminates comprising battery holders, between which the at least one battery is held on both sides;
   wherein each multi-layered structural laminate has a cooling plate layer and a current collector layer, the at least one battery being coupled electrically to the current collector layer;
   wherein at least one of the multi-layered structural laminates comprises a plurality of electrical insulating layers, which are arranged on both sides around the cooling plate layer; and
   wherein a multiplicity of fluid ducts from a metal material is integrated within each cooling plate layer.

12. The aircraft or spacecraft according to claim 11, wherein the battery arrangement forms part of a structural component of the aircraft or spacecraft.

* * * * *